US009663697B2

(12) United States Patent
Rached

(10) Patent No.: US 9,663,697 B2
(45) Date of Patent: May 30, 2017

(54) USE OF TERNARY COMPOSITIONS

(71) Applicant: ARKEMA FRANCE, Colombes (FR)

(72) Inventor: Wissam Rached, Chaponost (FR)

(73) Assignee: ARKEMA FRANCE, Colombes (FR)

(*) Notice: Subject to any disclaimer, the term of this patent is extended or adjusted under 35 U.S.C. 154(b) by 0 days.

(21) Appl. No.: 15/189,936

(22) Filed: Jun. 22, 2016

(65) Prior Publication Data
US 2016/0298014 A1 Oct. 13, 2016

Related U.S. Application Data

(63) Continuation of application No. 14/823,430, filed on Aug. 11, 2015, now Pat. No. 9,399,726, which is a continuation of application No. 14/329,556, filed on Jul. 11, 2014, now Pat. No. 9,127,191, which is a continuation of application No. 13/390,392, filed as application No. PCT/FR2010/051729 on Aug. 18, 2010, now Pat. No. 8,808,569.

(30) Foreign Application Priority Data

Sep. 11, 2009 (FR) ..................................... 09 56247

(51) Int. Cl.
C09K 5/04 (2006.01)
F25B 43/02 (2006.01)
F25B 9/00 (2006.01)

(52) U.S. Cl.
CPC .............. *C09K 5/045* (2013.01); *F25B 43/02* (2013.01); *C09K 2205/122* (2013.01); *C09K 2205/126* (2013.01); *C09K 2205/22* (2013.01); *F25B 9/006* (2013.01)

(58) Field of Classification Search
CPC .............. C09K 5/045; C09K 2205/126; C09K 2205/22; F25B 9/006
USPC ................. 252/67, 68; 62/467, 468
See application file for complete search history.

(56) References Cited

U.S. PATENT DOCUMENTS

| 8,070,977 | B2 | 12/2011 | Rached |
| 8,075,798 | B2 | 12/2011 | Rached |
| 8,246,850 | B2 | 8/2012 | Rached |
| 8,252,198 | B2 | 8/2012 | Rached |
| 8,557,135 | B2 | 10/2013 | Rached |
| 8,808,569 | B2* | 8/2014 | Rached .................. C09K 5/045 252/67 |
| 8,858,824 | B2 | 10/2014 | Boussand |
| 8,858,825 | B2 | 10/2014 | Guerin et al. |
| 8,894,874 | B2 | 11/2014 | Low |
| 9,011,711 | B2 | 4/2015 | Rached |
| 9,028,706 | B2 | 5/2015 | Rached et al. |
| 9,039,922 | B2 | 5/2015 | Rached |
| 9,074,115 | B2 | 7/2015 | Low |
| 9,127,191 | B2* | 9/2015 | Rached .................. C09K 5/045 |
| 9,133,379 | B2 | 9/2015 | Rached |
| 9,175,203 | B2 | 11/2015 | Rached |
| 9,267,064 | B2 | 2/2016 | Rached |
| 9,399,726 | B2* | 7/2016 | Rached .................. C09K 5/045 |
| 9,540,554 | B2* | 1/2017 | Minor .................. C09K 5/045 |
| 2006/0243944 | A1 | 11/2006 | Minor et al. |
| 2008/0184731 | A1 | 8/2008 | Sienel et al. |
| 2008/0230738 | A1 | 9/2008 | Minor et al. |
| 2008/0314073 | A1 | 12/2008 | Minor |
| 2009/0120619 | A1 | 5/2009 | Sievert et al. |
| 2009/0253820 | A1 | 10/2009 | Bowman |
| 2010/0044619 | A1 | 2/2010 | Hulse |
| 2011/0084228 | A1 | 4/2011 | Rached |
| 2011/0095224 | A1 | 4/2011 | Rached |
| 2011/0186772 | A1 | 8/2011 | Rached |
| 2011/0219791 | A1 | 9/2011 | Rached |
| 2011/0219792 | A1 | 9/2011 | Rached |
| 2011/0240254 | A1 | 10/2011 | Rached |
| 2011/0258147 | A1 | 10/2011 | Low |
| 2011/0284181 | A1 | 11/2011 | Rached |
| 2012/0049104 | A1 | 3/2012 | Rached |
| 2012/0056123 | A1 | 3/2012 | Rached |
| 2012/0068105 | A1 | 3/2012 | Rached et al. |
| 2012/0097885 | A9 | 4/2012 | Hulse et al. |
| 2012/0126187 | A1 | 5/2012 | Low |

(Continued)

FOREIGN PATENT DOCUMENTS

| DE | 20 2007 008 291 U1 | 10/2007 |
| FR | 2256381 | 7/1973 |
| FR | 2 182 956 | 12/1973 |
| FR | 2182956 | 12/1973 |
| JP | 58-104466 A | 6/1983 |
| JP | 2008-531836 A | 8/2008 |
| JP | 2009-532520 A1 | 9/2009 |
| WO | WO 2004/037913 A2 | 5/2004 |
| WO | WO 2005/105947 A2 | 11/2005 |
| WO | WO 2006/094303 A2 | 9/2006 |

(Continued)

OTHER PUBLICATIONS

International Search Report (English translation) mailed Mar. 10, 2011 in PCT/FR2010/051729, 3 pages, European Patent Office, Rijswijk, NL.

Boussand, Béatrice, U.S. Appl. No. 14/371,118 entitled "Heat Transfer Compositions Having Improved Miscibility With Lubricating Oil," filed Jul. 8, 2014.

Collier, Bertrand, et al., U.S. Appl. No. 14/651,855 entitled "Composition Including 2,3,3,3-Tetrafluoropropene," filed Jun. 12, 2015.

(Continued)

Primary Examiner — Douglas McGinty
(74) Attorney, Agent, or Firm — Buchanan Ingersoll & Rooney P.C.

(57) ABSTRACT

The use of a ternary composition of 2,3,3,3-tetrafluoropropene, 1,1,1,2-tetrafluoroethane and difluoromethane, as a heat-transfer fluid, in compression refrigeration systems with exchangers operating in counterflow mode or in cross-flow mode with counterflow tendency. A heat-transfer process in which a ternary composition of 2,3,3,3-tetrafluoropropene, 1,1,1,2-tetrafluoroethane and difluoromethane is used as a refrigerant in compression systems with exchangers operating in counterflow mode or in cross-flow mode with counterflow tendency.

20 Claims, No Drawings

(56) References Cited

U.S. PATENT DOCUMENTS

| | | |
|---|---|---|
| 2012/0144857 A1 | 6/2012 | Rached |
| 2012/0151958 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0205574 A1 | 8/2012 | Rached et al. |
| 2012/0255316 A1 | 10/2012 | Andre et al. |
| 2012/0298909 A1 | 11/2012 | Low |
| 2013/0055733 A1 | 3/2013 | Rached |
| 2013/0055739 A1 | 3/2013 | Rached |
| 2013/0092869 A1 | 4/2013 | Boussand |
| 2013/0096218 A1 | 4/2013 | Rached et al. |
| 2013/0105724 A1 | 5/2013 | Boussand |
| 2013/0145778 A1 | 6/2013 | Yana Motta et al. |
| 2013/0186114 A1 | 7/2013 | Guerin et al. |
| 2014/0008565 A1 | 1/2014 | Rached et al. |
| 2014/0075969 A1 | 3/2014 | Guerin et al. |
| 2014/0318160 A1 | 10/2014 | Rached |
| 2014/0326017 A1 | 11/2014 | Rached |
| 2015/0027146 A1 | 1/2015 | Boussand |
| 2015/0075165 A1 | 3/2015 | Low |
| 2015/0152306 A1 | 6/2015 | Rached |
| 2015/0152307 A1 | 6/2015 | Rached |
| 2015/0322317 A1 | 11/2015 | Collier et al. |
| 2015/0322321 A1 | 11/2015 | Deur-Bert et al. |
| 2015/0344761 A1 | 12/2015 | Rached |
| 2015/0353799 A1 | 12/2015 | Deur-Bert et al. |
| 2015/0353802 A1 | 12/2015 | Rached |
| 2016/0009555 A1 | 1/2016 | Bonnet et al. |
| 2016/0024363 A1 | 1/2016 | Rached |
| 2016/0025394 A1 | 1/2016 | Rached |

FOREIGN PATENT DOCUMENTS

| | | |
|---|---|---|
| WO | WO 2006/101563 A2 | 9/2006 |
| WO | WO 2006/101563 A3 | 9/2006 |
| WO | WO 2007/126414 A2 | 11/2007 |
| WO | WO 2007/126414 A3 | 11/2007 |
| WO | WO 2008/009922 A2 | 1/2008 |
| WO | WO 2008/009923 A2 | 1/2008 |
| WO | WO 2008/009928 A2 | 1/2008 |
| WO | WO 2010/000993 A2 | 1/2010 |
| WO | WO 2010/002023 A1 | 1/2010 |
| WO | WO 2010/059677 A2 | 5/2010 |
| WO | WO 2011/023923 A1 | 3/2011 |

OTHER PUBLICATIONS

Deur-Bert, Dominique, et al., U.S. Appl. No. 14/651,925 entitled "Composition Containing 2,3,3,3-Tetrafluoropropene and 1,2-Difluoroethylene," filed Jun. 12, 2015.

Deur-Bert, Dominique, et al., U.S. Appl. No. 14/655,500 entitled "Azeotropic or Quasi-Azeotropic Composition of Chloromethane," filed Jun. 25, 2015.

Rached, Wissam, U.S. Appl. No. 14/830,130 entitled "Binary Refrigerating Fluid," filed Aug. 19, 2015.

Bonnet, Phillippe, et al., U.S. Appl. No. 14/772,950 entitled "Composition Comprising HF and 2,3,3,3-Tetrafluoropropene," filed Sep. 4, 2015.

Rached, Wissam, U.S. Appl. No. 14/873,855 entitled "Heat Transfer Fluid," filed Oct. 2, 2015.

Rached, Wissam, U.S. Appl. No. 14/873,891 entitled "Ternary Compositions for Low-Capacity Refrigeration," filed Oct. 2, 2015.

Guérin, Sophie, et al., U.S. Appl. No. 14/903,461 entitled, "2,3,3,3-Tetrafluoropropene Compositions Having Improved Miscibility," filed Jan. 7, 2016.

Boussand, Beatrice, et al., U.S. Appl. No. 14/990,159, entitled "Stable 2,3,3,3-Tetrafluoropropene Composition," filed Jan. 7, 2016.

Rached, Wissam, U.S. Appl. No. 14/992,387 entitled, "Ternary Compositions for High-Capacity Refrigeration," filed Jan. 11, 2016.

Rached, Wissam, et al., U.S. Appl. No. 15/073,108 entitled "Stabilization of 1-Chloro-3,3,3-Trifluoropropene," filed Mar. 17, 2016.

* cited by examiner

USE OF TERNARY COMPOSITIONS

CROSS REFERENCE TO RELATED APPLICATIONS

The present application is a continuation of U.S. application Ser. No. 14/823,430, filed on Aug. 11, 2015, now U.S. Pat. No. 9,399,726, which is a continuation of U.S. application Ser. No. 14/329,556, filed on Jul. 11, 2014, now U.S. Pat. No. 9,127,191, which is a continuation of U.S. application Ser. No. 13/390,392, filed on Feb. 14, 2012, now U.S. Pat. No. 8,808,569, which is a U.S. national stage application of International Application No. PCT/FR2010/051729, filed on Aug. 18, 2010, which claims the benefit of French Application No. 09.56247, filed on Sep. 11, 2009. The entire contents of each of U.S. application Ser. No. 14/823,430, U.S. application Ser. No. 14/329,556, U.S. application Ser. No. 13/390,392, International Application No. PCT/FR2010/051729, and French Application No. 09.56247 are hereby incorporated herein by reference in their entirety.

TECHNICAL FIELD

The disclosure relates to the use of ternary compositions containing 2,3,3,3-tetrafluoropropene as heat-transfer fluids, in particular for medium-capacity refrigeration per unit volume swept by the compressor.

BACKGROUND

The problems posed by substances which delete the atmospheric ozone layer (ODP: ozone depletion potential) were addressed in Montreal, where the protocol imposing a reduction in the production and use of chlorofluorocarbons (CFCs) was signed. This protocol has been the subject of amendments which have required that CFCs be withdrawn and have extended regulatory control to other products, including hydrochlorofluorocarbons (HCFCs).

The refrigeration and air-conditioning industry has invested a great deal in the replacement of these refrigerants, and as a result, hydrofluorocarbons (HFCs) have been marketed.

The (hydro)chlorofluorocarbons used as expansion agents or solvents have also been replaced with HFCs.

In the automotive industry, the air-conditioning systems for vehicles sold in many countries have changed from a chlorofluorocarbon (CFC-12) refrigerant to a hydrofluorocarbon (1,1,1,2-tetrafluoroethane: HFC-134a) refrigerant which is less harmful to the ozone layer. However, from the viewpoint of the objectives set by the Kyoto protocol, HFC-134a (GWP=1300) is considered to have a high warming potential. The contribution to the greenhouse effect of a fluid is quantified by a criterion, the GWP (global warming potential) which indexes the warming potential by taking a reference value of 1 for carbon dioxide.

Since carbon dioxide is non-toxic and non-flammable and has a very low GWP, it has been proposed as a refrigerant in air-conditioning systems as a replacement for HFC-134a. However, the use of carbon dioxide has several drawbacks, in particular linked to the very high pressure at which it is used as a refrigerant in the existing apparatuses and technologies.

Document WO 2004/037913 discloses the use of compositions comprising at least one fluoroalkene having three or four carbon atoms, in particular pentafluoropropene and tetrafluoropropene, preferably having a GWP at most of 150, as heat-transfer fluids.

Document WO 2005/105947 teaches the addition to tetrafluoropropene, preferably 1,3,3,3-tetrafluoropropene, of a blowing coagent such as difluoromethane, pentafluoroethane, tetrafluoroethane, difluoroethane, heptafluoropropane, hexafluoropropane, pentafluoropropane, pentafluorobutane, water and carbon dioxide.

Document WO 2006/094303 discloses binary compositions of 2,3,3,3-tetrafluoropropene (HFO-1234yf) with difluoromethane (HFC-32), and of 2,3,3,3-tetrafluoropropene with 1,1,1,2-tetrafluoroethane (HFC-134a).

Quaternary mixtures comprising 1,1,1,2,3-pentafluoropropene (HFO-1225ye) in combination with difluoromethane, 2,3,3,3-tetrafluoropropene and HFC-134a were disclosed in this document. However, 1,1,1,2,3-pentafluoropropene is toxic.

Quaternary mixtures comprising 2,3,3,3-tetrafluoropropene in combination with iodotrifluoromethane ($CF_3I$), HFC-32 and HFC-134a have also been disclosed in document WO 2006/094303. However, $CF_3I$ has a non-zero ODP and poses stability and corrosion problems.

A heat exchanger is a device for transferring thermal energy from one fluid to another, without mixing them. The heat flux crosses the exchange surface which separates the fluids. Most commonly, this method is used to cool or heat a liquid or a gas that it is impossible to cool or heat directly.

In compression systems, the heat exchange between the refrigerant and the heat sources takes place by means of heat-transfer fluids. These heat-transfer fluids are in the gaseous state (the air in air-conditioning and direct expansion refrigeration), liquid state (the water in domestic heat pumps, glycolated water) or two-phase state.

There are various modes of transfer:
the two fluids are arranged in parallel and travel in the same direction: co-flow (antimethodic) mode;
the two fluids are arranged in parallel but travel in the opposite direction: counterflow (methodic) mode;
the two fluids are positioned perpendicularly: cross-flow mode. The cross-flow may be with co-flow or counterflow tendency;
one of the two fluids makes a U-turn in a wider pipe, which the second fluid passes through. This configuration is comparable to a co-flow exchanger over half the length, and for the other half, to a counterflow exchanger: pinhead mode.

DETAILED DESCRIPTION

The applicant has now discovered that ternary compositions of 2,3,3,3-tetrafluoropropene, 1,1,1,2-tetrafluoroethane and difluoromethane are particularly advantageous as a heat-transfer fluid in compression refrigeration systems with exchangers operating in counterflow mode or in cross-flow mode with counterflow tendency.

Thus, these compositions can be used as a heat-transfer fluid in optionally reversible heat pumps, in air-conditioning, industrial air-conditioning (paper, server rooms), in portable domestic air-conditioning, in domestic refrigeration and freezing, in low-temperature and medium-temperature refrigeration and refrigeration of refrigerated vehicles using compression systems with exchangers operating in counterflow mode or in cross-flow mode with counterflow tendency.

Thus, a first subject of the disclosure relates to the use of ternary compositions of 2,3,3,3-tetrafluoropropene, 1,1,1,2-tetrafluoroethane and difluoromethane as a heat-transfer fluid in compression refrigeration systems with exchangers operating in counterflow mode or in cross-flow mode with counterflow tendency.

Preferably, the compositions essentially contain from 2 to 80% by weight of 2,3,3,3-tetrafluoropropene, from 2 to 80% by weight of HFC-134a and from 2 to 80% by weight of HFC-32.

Advantageously, the compositions essentially contain from 45 to 80% by weight, preferably from 65 to 80% by weight of 2,3,3,3-tetrafluoropropene, from 5 to 25% by weight, preferably from 5 to 10% by weight of HFC-134a and from 15 to 30% by weight of HFC-32. The compositions used as a heat-transfer fluid of the disclosure do not have the abovementioned drawbacks and have both a zero ODP and a GWP which is lower than that of the existing heat-transfer fluids, such as R404A (ternary mixture of pentafluoroethane (44% by weight), trifluoroethane (52% by weight) and HFC-134a (4% by weight)) and R407C (ternary mixture of HFC-134a (52% by weight) pentafluoroethane (25% by weight) and HFC-32 (23% by weight)).

In addition, the compositions essentially containing from 5 to 25% by weight of 2,3,3,3-tetrafluoropropene, from 60 to 80% by weight of HFC-134a and from 15 to 25% by weight of HFC-32 are not inflammable.

The compositions used as a heat-transfer fluid in the disclosure have a critical temperature greater than 90° C. (critical temperature of R404A is 72° C.). These compositions can be used in heat pumps for providing heat at medium temperatures between 40 and 65° C. and also at higher temperatures between 72° C. and 90° C. (temperature range at which R404A cannot be used).

The compositions used as a heat-transfer fluid in the disclosure have saturation vapor densities which are less than the saturated vapor density of R404A. The volumetric capacities given by these compositions are equivalent to or greater than the volumetric capacity of R404A (between 90 and 131% depending on applications). By virtue of these properties, these compositions can operate with smaller pipe diameters and therefore less pressure drop in the steam pipework, thereby increasing the performance levels of the equipment.

The compositions used as a heat-transfer agent according to the disclosure can be stabilized. The stabilizer preferably represents at most 5% by weight relative to the ternary composition.

As stabilizers, mention may in particular be made of nitromethane, ascorbic acid, terephthalic acid, azoles such as tolutriazole or benzotriazole, phenolic compounds such as tocopherol, hydroquinone, t-butyl hydroquinone or 2,6-di-tert-butyl-4-methylphenol, epoxides (alkyl, optionally fluorinated or perfluorinated, or alkenyl or aromatic) such as n-butyl glycidyl ether, hexanediol diglycidyl ether, allyl glycidyl ether or butylphenyl glycidyl ether, phosphites, phosphates, phosphonates, thiols and lactones.

A second subject of the disclosure relates to a heat-transfer process in which the ternary compositions of 2,3,3,3-tetrafluoropropene, 1,1,1,2-tetrafluoroethane and difluoromethane, as defined above, are used as refrigerant in compression systems using exchangers operating in counterflow mode or in cross-flow mode with counterflow tendency.

The process according to the second subject can be carried out in the presence of lubricants such as mineral oil, alkylbenzene, polyalkylene glycol and polyvinyl ether.

Experimental Section

Calculation Tools

The RK-Soave equation is used for calculating the densities, enthalpies, entropies and liquid/vapor equilibrium data of the mixtures. The use of this equation requires knowledge of the properties of the pure bodies used in the mixtures in question and also the interaction coefficients for each binary mixture.

The data required for each pure body are: the boiling point, the critical temperature and the critical pressure, the curve of pressure as a function of temperature starting from the boiling point up to the critical point, and the saturated liquid and saturated vapor densities as a function of temperature.

HFC-32, HFC-134a:

The data on these products are published in the ASHRAE Handbook 2005 chapter 20, and are also available from Refrop (software developed by NIST for calculating the properties of refrigerants).

HFO-1234yf:

The data of the temperature-pressure curve for HFO-1234yf are measured by the static method. The critical temperature and the critical pressure are measured using a C80 calorimeter sold by Setaram. The densities, at saturation as a function of temperature, are measured using the vibrating tube densitometer technology developed by the laboratories of the Ecole des Mines of Paris.

Interaction Coefficient of the Binary Mixtures:

The RK-Soave equation uses binary interaction coefficients to represent the behavior of the products in mixtures. The coefficients are calculated as a function of the experimental liquid/vapor equilibrium data.

The technique used for the liquid/vapor equilibrium measurements is the static-cell analytical method. The equilibrium cell comprises a sapphire tube and is equipped with two electromagnetic ROLSITM samplers. It is immersed in a cryothermostat bath (HUBER HS40). A magnetic stirrer with a field drive rotating at varying speed is used to accelerate reaching the equilibria. The analysis of the samples is carried out by gas chromatography (HP5890 series II) using a katharometer (TCD).

HFC-32/HFO-1234yf, HFC-134a/HFO-1234yf:

The liquid/vapor equilibrium measurements on the binary mixture HFC-32/HFO-1234yf are carried out for the following isotherms: −10° C., 30° C. and 70° C.

The liquid/vapor equilibrium measurements on the binary mixture HFC-134a/HFO-1234yf are carried out for the following isotherms: 20° C.

HFC-32/HFC-134a:

The liquid/vapor equilibrium data for the binary mixture HFC-134a/HFC-32 are available from Refprop. Two isotherms (−20° C. and 20° C.) and one isobar (30 bar) are used to calculate the interaction coefficients for this binary mixture.

Compression System:

A compression system equipped with a counterflow condenser and evaporator, with a screw compressor and with an expansion valve is considered.

The system operates with 15° C. of overheat and 5° C. of undercooling. The minimum temperature difference between the secondary fluid and the refrigerant is considered to be about 5° C.

The isentropic efficiency of the compressors depends on the compression ratio. This efficiency is calculated according to the following equation:

$$\eta_{isen} = a - b(\tau - c)^2 - \frac{d}{\tau - e} \qquad (1)$$

For a screw compressor, the constants a, b, c, d and e of the isentropic efficiency equation (1) are calculated according to the standard data published in the "Handbook of air conditioning and refrigeration, page 11.52".

The % CAP is the percentage of the ratio of the volumetric capacity supplied by each product over the capacity of R404A.

The coefficient of performance (COP) is defined as being the useful power supplied by the system over the power provided or consumed by the system.

The Lorenz coefficient of performance (COPLorenz) is a reference coefficient of performance. It is a function of temperatures and is used for comparing the COPs of various fluids.

The Lorenz coefficient of performance is defined as follows:

(The temperatures T are in K)

$$T_{average}^{condenser} = T_{inlet}^{condenser} - T_{outlet}^{condenser} \qquad (2)$$

$$T_{average}^{evaporator} = T_{outlet}^{evaporator} - T_{inlet}^{evaporator} \qquad (3)$$

The Lorenz COP in the case of air-conditioning and refrigeration is:

$$COPlorenz = \frac{T_{average}^{evaporator}}{T_{average}^{condenser} - T_{average}^{evaporator}} \qquad (4)$$

The Lorenz COP in the case of heating is:

$$COPlorenz = \frac{T_{average}^{condenser}}{T_{average}^{condenser} - T_{average}^{evaporator}} \qquad (5)$$

For each composition, the coefficient of performance of the Lorenz cycle is calculated as a function of the corresponding temperatures.

The % COP/COPLorenz is the ratio of the COP of the system relative to the COP of the corresponding Lorenz cycle.

Heating Mode Results:

In heating mode, the compression system operates between a temperature for inlet of the refrigerant into the evaporator of −5° C. and a temperature for inlet of the refrigerant into the condenser of 50° C. The system supplies heat at 45° C.

The performance levels of the compositions according to the disclosure under the heating mode operating conditions are given in table 1. The values of the constituents (HFO-1234yf, HFC-32, HFC-134a) for each composition are given as percentage by weight.

TABLE 1

| HFO-1234yf | HFC-32 | HFC-134a | Evap outlet temp (° C.) | Comp outlet temp (° C.) | Cond outlet T (° C.) | Evap P (bar) | Cond P (bar) | Ratio (w/w) | Glide | Comp efficiency | % CAP | % COP/ COPLorenz |
|---|---|---|---|---|---|---|---|---|---|---|---|---|
| R404A | | | −5 | 77 | 50 | 5.2 | 23.0 | 4.4 | 0.38 | 79.7 | 100 | 57.7 |
| 80 | 15 | 5 | 0 | 77 | 43 | 4.0 | 16.5 | 4.2 | 4.57 | 80.5 | 90 | 64.7 |
| 75 | 20 | 5 | 0 | 79 | 43 | 4.4 | 17.7 | 4.1 | 5.19 | 80.8 | 98 | 64.8 |
| 70 | 25 | 5 | 0 | 82 | 43 | 4.7 | 19.0 | 4.0 | 5.37 | 80.9 | 106 | 64.7 |
| 55 | 20 | 25 | −1 | 82 | 44 | 4.2 | 17.7 | 4.2 | 4.43 | 80.4 | 97 | 65.2 |
| 50 | 25 | 25 | 0 | 84 | 44 | 4.5 | 18.8 | 4.2 | 4.71 | 80.5 | 104 | 65.2 |
| 45 | 30 | 25 | 0 | 87 | 44 | 4.8 | 19.9 | 4.2 | 4.74 | 80.6 | 111 | 65.1 |
| 40 | 35 | 25 | 0 | 90 | 45 | 5.0 | 20.9 | 4.2 | 4.59 | 80.5 | 116 | 64.9 |
| 35 | 40 | 25 | −1 | 93 | 45 | 5.2 | 21.9 | 4.2 | 4.34 | 80.4 | 121 | 64.6 |
| 40 | 20 | 40 | −1 | 84 | 45 | 4.1 | 17.6 | 4.3 | 4.21 | 80.1 | 96 | 65.4 |
| 35 | 25 | 40 | 0 | 86 | 45 | 4.4 | 18.6 | 4.3 | 4.56 | 80.2 | 103 | 65.5 |
| 30 | 30 | 40 | 0 | 89 | 45 | 4.6 | 19.6 | 4.2 | 4.71 | 80.3 | 109 | 65.4 |
| 25 | 35 | 40 | 0 | 92 | 45 | 4.8 | 20.5 | 4.2 | 4.71 | 80.3 | 114 | 65.3 |
| 20 | 40 | 40 | 0 | 95 | 45 | 5.0 | 21.3 | 4.3 | 4.62 | 80.3 | 119 | 65.1 |
| 15 | 20 | 65 | −1 | 87 | 45 | 3.8 | 17.1 | 4.5 | 4.07 | 79.5 | 94 | 65.7 |
| 10 | 25 | 65 | −1 | 90 | 45 | 4.0 | 17.9 | 4.4 | 4.49 | 79.8 | 99 | 65.8 |

Cooling or Air-Conditioning Mode Results:

In cooling mode, the compression system operates between a temperature for inlet of the refrigerant into the evaporator of −5° C. and a temperature for inlet of the refrigerant into the condenser of 50° C. The system supplies refrigeration at 0° C.

The performance levels of the compositions according to the disclosure under the cooling mode operating conditions are given in table 2. The values of the constituents (HFO-1234yf, HFC-32, HFC-134a) for each composition are given as percentage by weight.

TABLE 2

| HFO-1234yf | HFC-32 | HFC-134a | Evap outlet temp (° C.) | Comp outlet temp (° C.) | Cond outlet T (° C.) | Evap P (bar) | Cond P (bar) | Ratio (w/w) | Glide | Comp efficiency | % CAP | % COP/ COPLorenz |
|---|---|---|---|---|---|---|---|---|---|---|---|---|
| R404A | | | −5 | 77 | 50 | 5.2 | 23.0 | 4.4 | 0.38 | 79.7 | 100 | 47.9 |
| 75 | 20 | 5 | 0 | 79 | 43 | 4.4 | 17.7 | 4.1 | 5.19 | 80.8 | 106 | 56.6 |
| 70 | 25 | 5 | 0 | 82 | 43 | 4.7 | 19.0 | 4.0 | 5.37 | 80.9 | 114 | 56.6 |

TABLE 2-continued

| | | | Evap outlet temp (° C.) | Comp outlet temp (° C.) | Cond outlet T (° C.) | Evap P (bar) | Cond P (bar) | Ratio (w/w) | Glide | Comp efficiency | % CAP | % COP/COPLorenz |
|---|---|---|---|---|---|---|---|---|---|---|---|---|
| 65 | 30 | 5 | 0 | 85 | 44 | 5.0 | 20.2 | 4.0 | 5.22 | 80.9 | 121 | 56.4 |
| 60 | 15 | 25 | −1 | 79 | 45 | 3.9 | 16.6 | 4.3 | 3.83 | 80.2 | 95 | 56.5 |
| 55 | 20 | 25 | −1 | 82 | 44 | 4.2 | 17.7 | 4.2 | 4.43 | 80.4 | 104 | 57.0 |
| 50 | 25 | 25 | 0 | 84 | 44 | 4.5 | 18.8 | 4.2 | 4.71 | 80.5 | 112 | 57.2 |
| 45 | 30 | 25 | 0 | 87 | 44 | 4.8 | 19.9 | 4.2 | 4.74 | 80.6 | 119 | 57.2 |
| 40 | 35 | 25 | 0 | 90 | 45 | 5.0 | 20.9 | 4.2 | 4.59 | 80.5 | 125 | 57.1 |
| 35 | 40 | 25 | −1 | 93 | 45 | 5.2 | 21.9 | 4.2 | 4.34 | 80.4 | 130 | 56.9 |
| 45 | 15 | 40 | −1 | 81 | 45 | 3.8 | 16.6 | 4.4 | 3.59 | 79.8 | 95 | 56.8 |
| 40 | 20 | 40 | −1 | 84 | 45 | 4.1 | 17.6 | 4.3 | 4.21 | 80.1 | 103 | 57.3 |
| 35 | 25 | 40 | 0 | 86 | 45 | 4.4 | 18.6 | 4.3 | 4.56 | 80.2 | 111 | 57.6 |
| 30 | 30 | 40 | 0 | 89 | 45 | 4.6 | 19.6 | 4.2 | 4.71 | 80.3 | 118 | 57.6 |
| 25 | 35 | 40 | 0 | 92 | 45 | 4.8 | 20.5 | 4.2 | 4.71 | 80.3 | 124 | 57.6 |
| 20 | 40 | 40 | 0 | 95 | 45 | 5.0 | 21.3 | 4.3 | 4.62 | 80.3 | 129 | 57.5 |
| 20 | 15 | 65 | −2 | 84 | 46 | 3.5 | 16.3 | 4.6 | 3.43 | 79.2 | 93 | 57.3 |
| 15 | 20 | 65 | −1 | 87 | 45 | 3.8 | 17.1 | 4.5 | 4.07 | 79.5 | 101 | 57.8 |
| 10 | 25 | 65 | −1 | 90 | 45 | 4.0 | 17.9 | 4.4 | 4.49 | 79.8 | 107 | 58.1 |
| 5 | 15 | 80 | −2 | 86 | 46 | 3.4 | 15.9 | 4.7 | 3.28 | 78.8 | 91 | 57.4 |

Low-Temperature Refrigeration Mode Results:

In low-temperature refrigeration mode, the compression system operates between a temperature for inlet of the refrigerant into the evaporator of −30° C. and a temperature for inlet of the refrigerant into the condenser of 40° C. The system supplies refrigeration at −25° C.

The performance levels of the compositions according to the disclosure under the low-temperature refrigeration mode operating conditions are given in table 3. The values of the constituents (HFO-1234yf, HFC-32, HFC-134a) for each composition are given as percentage by weight.

TABLE 3

| | | | Evap outlet temp (° C.) | Comp outlet temp (° C.) | Cond outlet T (° C.) | Evap P (bar) | Cond P (bar) | Ratio (w/w) | Glide | Comp efficiency | % CAP | % COP/COPLorenz |
|---|---|---|---|---|---|---|---|---|---|---|---|---|
| | R404A | | −30 | 101 | 40 | 2.1 | 18.1 | 8.8 | 0.45 | 53.7 | 100 | 31.7 |
| HFO-1234yf | HFC-32 | HFC-134a | | | | | | | | | | |
| 75 | 20 | 5 | −25 | 103 | 33 | 1.7 | 13.8 | 8.3 | 4.68 | 58.0 | 101 | 39.3 |
| 70 | 25 | 5 | −25 | 106 | 33 | 1.8 | 14.8 | 8.1 | 4.94 | 59.2 | 110 | 40.2 |
| 65 | 30 | 5 | −25 | 110 | 33 | 2.0 | 15.8 | 8.1 | 4.88 | 59.6 | 118 | 40.5 |
| 60 | 35 | 5 | −25 | 115 | 34 | 2.1 | 16.7 | 8.1 | 4.59 | 59.4 | 125 | 40.4 |
| 55 | 40 | 5 | −26 | 121 | 35 | 2.2 | 17.6 | 8.1 | 4.15 | 58.9 | 131 | 40.0 |
| 50 | 25 | 25 | −26 | 113 | 34 | 1.7 | 14.7 | 8.4 | 4.31 | 57.0 | 108 | 39.4 |
| 45 | 30 | 25 | −26 | 117 | 34 | 1.9 | 15.5 | 8.3 | 4.41 | 57.5 | 116 | 39.8 |
| 40 | 35 | 25 | −26 | 122 | 34 | 2.0 | 16.3 | 8.3 | 4.34 | 57.6 | 122 | 39.8 |
| 35 | 40 | 25 | −26 | 127 | 35 | 2.0 | 17.1 | 8.3 | 4.15 | 57.4 | 128 | 39.5 |
| 30 | 30 | 40 | −25 | 124 | 34 | 1.8 | 15.2 | 8.6 | 4.52 | 55.7 | 113 | 38.8 |
| 25 | 35 | 40 | −25 | 128 | 35 | 1.9 | 15.9 | 8.5 | 4.59 | 56.0 | 119 | 39.0 |
| 20 | 40 | 40 | −25 | 134 | 35 | 1.9 | 16.5 | 8.5 | 4.56 | 56.0 | 124 | 38.9 |

The invention claimed is:

1. A method of replacing R-404A in a compression refrigeration system, the method comprising replacing a first heat transfer fluid of R-404A with a second heat-transfer fluid consisting essentially of:
   from 5 to 25% by weight of 2,3,3,3-tetrafluoropropene;
   from 60 to 80% by weight of 1,1,1,2-tetrafluoroethane;
   from 15 to 25% by weight of difluoromethane; and
   optionally, a stabilizer.

2. The method as claimed in claim 1, wherein the compression refrigeration system comprises exchangers operating in countercurrent mode or in crossed-current mode with countercurrent tendency.

3. The method as claimed in claim 1, wherein the second heat-transfer fluid includes the stabilizer.

4. The method as claimed in claim 3, wherein the stabilizer is selected from the group consisting of nitromethane, ascorbic acid, terephthalic acid, azoles, phenolic compounds, epoxides, phosphites, phosphates, phosphonates, thiols and lactones.

5. The method as claimed in claim 3, wherein stabilizer represents at most 5% by weight relative to the remainder of second heat-transfer fluid.

6. The method as claimed in claim 1, wherein the second heat-transfer fluid consists essentially of:
   from 5 to 15% by weight of 2,3,3,3-tetrafluoropropene;
   from 60 to 80% by weight of 1,1,1,2-tetrafluoroethane;
   from 15 to 25% by weight of difluoromethane; and
   optionally, a stabilizer.

7. The method according to claim 1, wherein the second heat-transfer fluid consists of:
   from 5 to 25% by weight of 2,3,3,3-tetrafluoropropene;
   from 60 to 80% by weight of 1,1,1,2-tetrafluoroethane;
   from 15 to 25% by weight of difluoromethane; and
   optionally, a stabilizer.

8. The method according to claim 1, wherein the second heat-transfer fluid consists of:
   from 5 to 15% by weight of 2,3,3,3-tetrafluoropropene;
   from 60 to 80% by weight of 1,1,1,2-tetrafluoroethane;
   from 15 to 25% by weight of difluoromethane; and
   optionally, a stabilizer.

9. A method of replacing R-404A in a compression refrigeration system, the method comprising replacing a first heat transfer fluid of R-404A with a second heat-transfer fluid consisting essentially of:
from 45 to 80% by weight of 2,3,3,3-tetrafluoropropene;
from 5 to 25% by weight of 1,1,1,2-tetrafluoroethane;
from 15 to 30% by weight of difluoromethane; and
optionally, a stabilizer.

10. The method as claimed in claim 9, wherein the compression refrigeration system comprises exchangers operating in countercurrent mode or in crossed-current mode with countercurrent tendency.

11. The method as claimed in claim 9, wherein the second heat-transfer fluid includes the stabilizer.

12. The method as claimed in claim 11, wherein the stabilizer is selected from the group consisting of nitromethane, ascorbic acid, terephthalic acid, azoles, phenolic compounds, epoxides, phosphites, phosphates, phosphonates, thiols and lactones.

13. The method as claimed in claim 11, wherein stabilizer represents at most 5% by weight relative to the remainder of second heat-transfer fluid.

14. The method according to claim 9, wherein the second heat transfer fluid consists of:
from 45 to 80% by weight of 2,3,3,3-tetrafluoropropene;
from 5 to 25% by weight of 1,1,1,2-tetrafluoroethane; and
from 15 to 30% by weight of difluoromethane.

15. A method of replacing R-404A in a compression refrigeration system, the method comprising replacing a first heat transfer fluid of R-404A with a second heat-transfer fluid consisting essentially of:
from 65 to 80% by weight of 2,3,3,3-tetrafluoropropene;
from 5 to 10% by weight of 1,1,1,2-tetrafluoroethane;
from 15 to 30% by weight of difluoromethane; and
optionally, a stabilizer.

16. The method as claimed in claim 15, wherein the compression refrigeration system comprises exchangers operating in countercurrent mode or in crossed-current mode with countercurrent tendency.

17. The method as claimed in claim 15, wherein the second heat-transfer fluid includes the stabilizer.

18. The method as claimed in claim 17, wherein the stabilizer is selected from the group consisting of nitromethane, ascorbic acid, terephthalic acid, azoles, phenolic compounds, epoxides, phosphites, phosphates, phosphonates, thiols and lactones.

19. The method as claimed in claim 17, wherein stabilizer represents at most 5% by weight relative to the remainder of second heat-transfer fluid.

20. The method according to claim 15, wherein the second heat-transfer fluid consists of:
from 65 to 80% by weight of 2,3,3,3-tetrafluoropropene;
from 5 to 10% by weight of 1,1,1,2-tetrafluoroethane; and
from 15 to 30% by weight of difluoromethane.

* * * * *